US009482556B2

(12) United States Patent
Platzer et al.

(10) Patent No.: US 9,482,556 B2
(45) Date of Patent: Nov. 1, 2016

(54) MEASURING SYSTEM FOR REGISTERING THE ABSOLUTE ROTATION ANGLE OF A ROTATING, MEASURED OBJECT

(75) Inventors: Wilfried Platzer, Freiburg (DE); Benjamin Hofmann, Mullheim (DE)

(73) Assignee: Auma Riester GmbH + Co. KG, Mullheim (DE)

( * ) Notice: Subject to any disclaimer, the term of this patent is extended or adjusted under 35 U.S.C. 154(b) by 539 days.

(21) Appl. No.: 14/002,781

(22) PCT Filed: Mar. 2, 2012

(86) PCT No.: PCT/EP2012/000928
§ 371 (c)(1),
(2), (4) Date: Sep. 3, 2013

(87) PCT Pub. No.: WO2012/119732
PCT Pub. Date: Sep. 13, 2012

(65) Prior Publication Data
US 2014/0005976 A1   Jan. 2, 2014

(30) Foreign Application Priority Data

Mar. 4, 2011 (DE) .......................... 10 2011 013 133
Jun. 27, 2011 (DE) .......................... 10 2011 106 339

(51) Int. Cl.
*G06F 19/00* (2011.01)
*G01D 5/04* (2006.01)
(Continued)

(52) U.S. Cl.
CPC ................ *G01D 5/04* (2013.01); *G01B 21/22* (2013.01); *G01D 5/145* (2013.01)

(58) Field of Classification Search
CPC ............ G01R 15/202; G01R 19/2506; G01R 21/133

USPC ............................. 702/61–64, 182–185, 188
See application file for complete search history.

(56) References Cited

U.S. PATENT DOCUMENTS

| 4,572,951 A | 2/1986 | Toda |
| 5,146,173 A | 9/1992 | Jurkewitz |

(Continued)

FOREIGN PATENT DOCUMENTS

| DE | 3246959 A1 | 7/1983 |
| DE | 19821467 A1 | 11/1999 |

(Continued)

OTHER PUBLICATIONS

Sep. 10, 2013 International Preliminary Report on Patentability, WIPO, Geneva Switzerland.

(Continued)

*Primary Examiner* — Edward Raymond
(74) *Attorney, Agent, or Firm* — Bacon & Thomas, PLLC

(57) ABSTRACT

A measuring system for registering the absolute rotation angle of a rotating, measured object, wherein a first gear is associated with a shaft of the measured object, wherein the first gear directly or indirectly engages at least a second gear and a third gear and wherein tooth counts the individual gears differ from one another. There is associated with each gear a rotation angle sensor, which registers the rotation angle of the associated gear. A calculating unit is provided, which ascertains at least the difference between the rotation angle of the second gear and that of the first gear and the difference between the rotation angle of the third gear and that of the first gear and, based on a summing of the differences of the ascertained rotation angle of the gears, determines the number of whole numbered revolutions and the remainder rotation angle of the shaft of the measured object.

11 Claims, 4 Drawing Sheets

(51) Int. Cl.
*G01B 21/22* (2006.01)
*G01D 5/14* (2006.01)

(56) References Cited

U.S. PATENT DOCUMENTS

| | | |
|---|---|---|
| 6,466,889 B1 | 10/2002 | Schodlbauer |
| 6,507,188 B1 | 1/2003 | Dilger |
| 6,618,688 B2 | 9/2003 | Schodlbauer |
| 7,258,027 B2 | 8/2007 | Oike |
| 7,406,772 B2 | 8/2008 | Siraky |
| 7,637,020 B2 | 12/2009 | Maier |
| 8,283,917 B2 | 10/2012 | Sano |
| 2012/0152034 A1* | 6/2012 | Kaess ............ B62D 6/10 73/862.333 |

FOREIGN PATENT DOCUMENTS

| | | |
|---|---|---|
| DE | 19849554 C1 | 3/2000 |
| DE | 19855960 A1 | 6/2000 |
| DE | 10048911 C1 | 4/2002 |
| DE | 10226988 A1 | 1/2004 |
| DE | 10332413 B3 | 4/2005 |
| DE | 102006006359 A1 | 8/2007 |
| EP | 1457762 A1 | 9/2004 |
| EP | 1536217 A1 | 6/2005 |
| EP | 2253939 A2 | 11/2010 |
| WO | 2005008182 A1 | 1/2005 |

OTHER PUBLICATIONS

International Search Report, EPO, The Netherlands, Aug. 13, 2012.

* cited by examiner

MEASURING SYSTEM FOR REGISTERING THE ABSOLUTE ROTATION ANGLE OF A ROTATING, MEASURED OBJECT

TECHNICAL FIELD

The invention relates to a measuring system for registering the absolute rotation angle of a rotating, measured object.

BACKGROUND DISCUSSION

Known from DE 198 21 467 A1 is a one-, two- or multidimensional, difference transmission for high resolution measuring of the number of whole numbered revolutions of a shaft. In the simplest case of the one-dimensional, difference transmission, only two gears are used. These differ as regards tooth count by one tooth. One of the gears is mounted directly on the shaft to be measured and drives the second gear. Based on the angular positions of the two gears relative to one another, the number of revolutions of the shaft can be determined.

Disclosed in DE 198 21 467 A1 is, furthermore, a two-dimensional, difference transmission having three gears, wherein a first gear is again associated with the shaft to be measured, while the two other gears are driven directly and/or indirectly by the first gear. Via the basic combinations, which result for the different number of rotations of the gears and which are possible in the case of defined tooth counts of the individual gears, the number of whole numbered revolutions is ascertained. In order to achieve uniqueness as regards the number of whole numbered revolutions, standardized base values of the basic combinations are calculated for the different numbers of rotations and stored in a two-dimensional array. In such case, the standardized base values serve as memory coordinates, based on which the whole numbered number of rotations can be ascertained. The disadvantage of the known solution is that the resolution lies in the vicinity of one whole numbered revolution. With the known solution, it is not possible currently to determine the exact angular position of the shaft of the measured object.

In connection with actuators, a high resolution, multi-turn, spur gear transmission is known for measuring the absolute rotation angle. In the case of the known spur gear transmission, a number of transmission stages coupled with one another are applied. In the case of a preferred solution of the multi-turn, spur gear transmission, 23 gears and five position sensors are applied. The individual transmission stages must be manufactured with high precision, in order to minimize slack in the individual transmission stages arranged one after the other.

SUMMARY OF THE INVENTION

An object of the invention is to provide a simple and cost effective measuring system for registering the absolute rotation angle of a rotating, measured object.

The object is achieved by features including that a first gear is associated with the shaft of the measured object, wherein the first gear directly or indirectly engages at least a second gear and a third gear and wherein tooth counts of the individual gears differ from one another. Furthermore, there is associated with each gear a rotation angle sensor, which registers the rotation angle of the associated gear, wherein a calculating unit is provided, which ascertains at least the difference between the rotation angle of the first gear and that of the second gear and the difference between the rotation angle of the first gear and that of the third gear and based on a summing of the differences of the ascertained rotation angles of the gears, determines the number of whole numbered revolutions and the remainder rotation angle of the shaft of the measured object. Furthermore, it is advantageous, when a standardizing to the slope of the summing of the differences of the ascertained rotation angles is performed.

The measuring system of the invention permits measuring the exact current angular position of a shaft of a measured object in combination with evaluating the whole numbered number of revolutions of the shaft.

The difference, movement sensor of the invention includes preferably three gears coupled with one another, wherein the gears have different tooth counts. The gears can be embodied as spur gears and/or as internally toothed gears and/or as toothed belts and/or as sprockets and/or as friction gears. In the case of friction gears, the difference in tooth count is not limited to whole, positive numbers. Here, the difference in tooth count can, generally stated, correspond to any positive real number greater than or equal to 1.

The difference, movement sensor of the invention can largely eliminate the problems with slack in the transmission stages. Since the number of transmission stages in the case of the measuring system of the invention is lessened significantly relative to the known solution, the measuring system of the invention can be cost effectively and compactly implemented. It can, moreover, be connected with the shaft of the rotating, measured object without problem. Especially advantageous in connection with the measuring system of the invention is that for adjustment and for function checking of the measuring system, e.g. during the manufacturing, a simple revolution of all three gears is sufficient. Thus, also a function test of the measuring system can be performed rapidly and without great effort.

An advantageous embodiment of the measuring system of the invention provides that optical, magnetic and/or electromechanical rotation angle sensors are applied for registering the rotation angles of the individual gears. Preferably, moreover, Hall sensors are used.

As already described above, rotation angle sensors register the rotation angles of all gears, in each case, in degrees. The differences between the rotation angle of the second gear and the first gear and between the third gear and the first gear are utilized for ascertaining the whole numbered number of revolutions of the shaft of the measured object, on which the first gear is secured. Preferably, moreover, the tooth counts of the gears differ by one tooth, and, indeed, in such a manner that the difference between the tooth count of the first gear and the second gear and between the first gear and the third gear, in each case, equals 1. If, for example, the first gear is associated with the shaft of the measured object and has a tooth count of 25, then the tooth count of the second gear amounts to 26 and the tooth count of the third gear to 24.

Due to the difference in tooth count of the first gear relative to the second gear and of the first gear relative to the third gear, wherein the difference equals dZ and wherein dZ is greater than or equal to 1, the total angle resolution of the measuring system is divided into n main sections. In such case, n is greater than or equal to 1. The calculating unit ascertains the corresponding absolute angle associated with the main section based on the relative positions of the gears.

Furthermore, it is provided in connection with the measuring system of the invention that the calculating unit ascertains the multi-turn resolution TurnRes in the case of determining the absolute rotation angle using the subresolution SR in the following way, wherein SR is the angular resolution of a main section:

$$SR = \frac{1}{\left[\left(\frac{z_1^2}{z_2 \cdot z_3}\right) - 1\right] \cdot 2}$$

$$TurnRes = n \cdot SR$$

In such case, TurnRes∈N and n∈N, SR∈Q and TurnRes≥SR, wherein TurnRes is the multi-turn resolution in the case of smallest possible n.

A preferred embodiment of the measuring system of the invention provides that the angle sensor of the gear associated with the shaft of the measured object registers the remainder rotation angle, i.e. the single-turn resolution, directly. Alternatively, it is provided that the calculating unit determines the remainder rotation angle, i.e. the single-turn resolution, based on the decimal fraction portion in the case of calculating the whole numbered revolutions, wherein, for standardizing to the slope of SumDiff, preferably the following equation is used:

$$Turn = SumDiff \cdot \frac{SR}{360°} + zMS \cdot SR$$

wherein zMS≤n and zMS is the main section MS associated with the corresponding absolute angle. The whole numbered part of Turn is the number of full revolutions of the shaft of the measured object, while the decimal fraction portion describes the remainder rotation angle. SumDiff is the sum of the differences of the rotation angles $\phi_{Z1}$, $\phi_{Z2}$, $\phi_{Z3}$, of the individual gears Z1, Z2, Z3 and is calculated according to the following formula:

SumDiff=2·$\phi_{Z1}$−$\phi_{Z2}$−$\phi_{Z3}$.

In order to compensate inaccuracies and slack in the transmission of the measuring system occurring in the rotation angle registering, an advantageous embodiment of the measuring system of the invention provides: The calculating unit divides by the difference forming of the ascertained rotation angles of the second and third gears the angular resolution of the measuring system into subsections SS. In such case, the number of subsections depends on the tooth count of the first gear. Especially, the slope of the subsections SS is greater than the slope of the main section MS, respectively the main sections zMS.

Preferably, the measuring system of the invention is applied in the case of a control element, respectively an actuator, in automation- or manufacturing technology. Of course, the measuring system of the invention is not limited to these applications. The measuring system of the invention can also be used, for example, for printing presses and automobiles.

In the case of use of the measuring system of the invention for a control element, respectively an actuator, the measured object is preferably the drive shaft and/or the output shaft of an actuator drive, which serves for actuating a flow control mechanism. The drive shaft is, moreover, connected with an actuating element. The actuating element is an electric motor and/or an adjusting wheel, respectively handwheel. The flow control mechanism is coupled with the output shaft. For the purpose of reducing the high RPM of the electric motor into the relatively low RPM of the flow control mechanism, in the case of many applications, usually a speed reduction transmission is arranged between the actuating element and the flow control mechanism.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
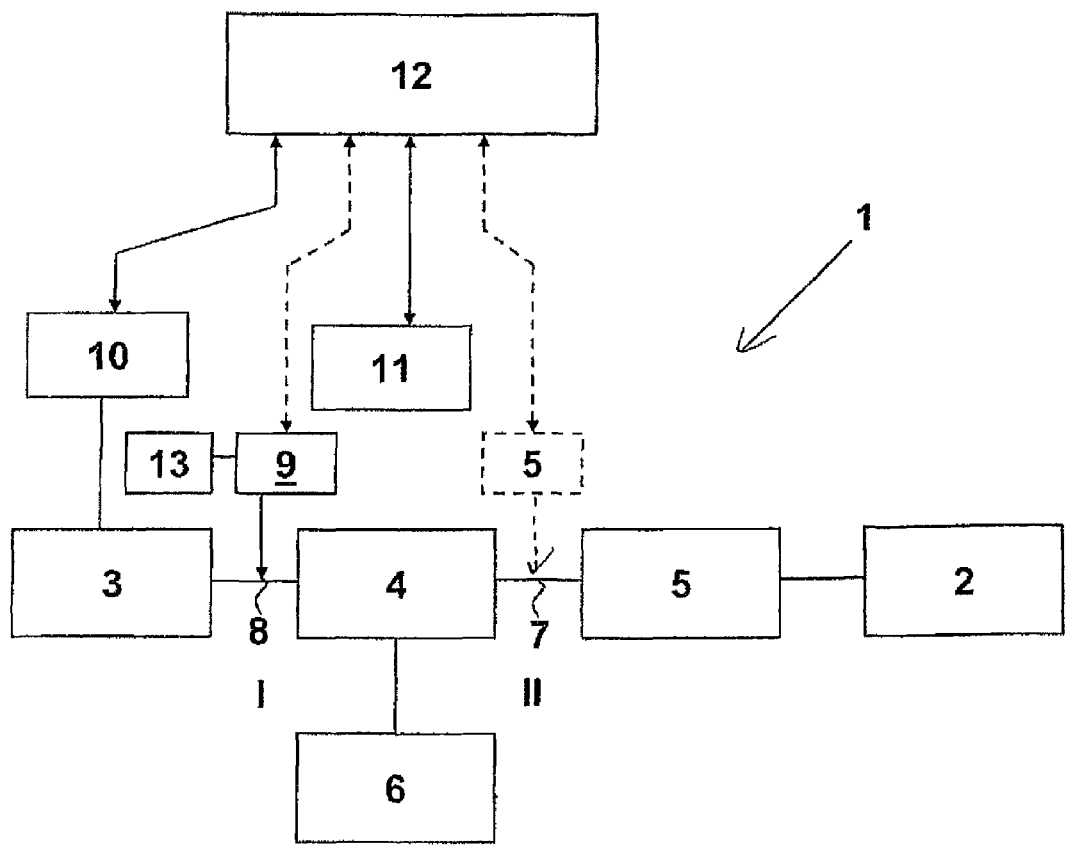
FIG. 1 is a schematic representation of a control element, respectively actuator.

FIG. 1 is a schematic representation of a control element 1, respectively an actuator 1, for actuating a flow control mechanism 2. Flow control mechanism 2 is, for example, a valve, a gate, a throttle or a baffle.

The control element 1, respectively the actuator 1, is composed usually of an electric motor 3 with corresponding sensor system 10, an actuator drive 4 with corresponding sensor system 11, a speed reduction transmission 5 and a flow control mechanism 2. Control of the actuator 1 occurs by means of the superordinated control unit 12. The control unit 12 can be integrated in the actuator drive 4, it can be built onto the actuator drive 4 or it can be embodied as a separate component. The actuator drives 4 used in the process industry in general, particularly in processes, in which a product is made from a raw or starting material by the application of chemical, physical or biological procedures, for flow control mechanisms 2 are designed in such a manner that they can in the case of low RPM (4-180 revolutions/min) transmit high torques (30-630,000 Nm), wherein the transmitted torque must, even in the case of small angles of rotation, be highly constant.

The torque transmission between the electric motor 3 and the flow control mechanism 2 occurs via the speed reduction transmission 5. The speed reduction transmission 5 is necessary, in order to convert the high RPM of electric motor 3 into the desired, highly constant, output RPM for actuating the flow control mechanism 2. Different transmissions can be applied for the speed reduction transmission 5. Examples can include a bevel gear- or spur gear transmission, a worm gear transmission, a superimposed transmission or a lever transmission. The torque range in the case of rotary drives reaches to a torque level of 32,000 Nm; in the case of rotary drives with a less than 360 degree range, torques up to 630,000 Nm can be implemented.

In order to fulfill a process automation safety standard, the actuator must be operable in emergency via a separately actuatable, adjusting wheel 6. Adjusting wheel 6 is used, moreover, also in the case of start-up, respectively restarting, of the actuator drive 4 following a malfunction. Adjusting wheel 6 is usually a handwheel, which is manually operable by operating personnel, whereby the flow control mechanism 2 can be brought into a desired position.

For the purpose of separating manual operation and motor operation, a coupling mechanism (not shown separately in FIG. 1) is provided. The coupling mechanism is usually so embodied and/or arranged that, in motor operation, the electric motor 3 is directly coupled with the output shaft 7 and the adjusting wheel 6 is uncoupled, while in manual operation the output shaft 7 is coupled with the adjusting wheel 6 and the electric motor 3 is uncoupled. In this way, a separation between motor operation and manual operation is provided. Especially, the coupling mechanism is embodied in such a manner that the adjusting wheel 6 is automatically uncoupled from the drive shaft 8, as soon as the actuator drive 4 works in motor operation. Motor operation thus has precedence over manual operation. Corresponding actuator drives 4 are available from the assignee.

The registering of the rotation angle of the drive shaft 8 or the output shaft 7 occurs via the measuring system of the invention, which will now be described in greater detail based on the subsequent figures. The labels I and II in FIG. 1 mark different positions, where the measuring system of the invention can be mounted in the control element 1. While the positioning of the measuring system according to position I is preferable in connection with the use of a pivot drive, the positioning of the measuring system according to position II is preferable in connection with the use of a rotary drive.

Figure 2:
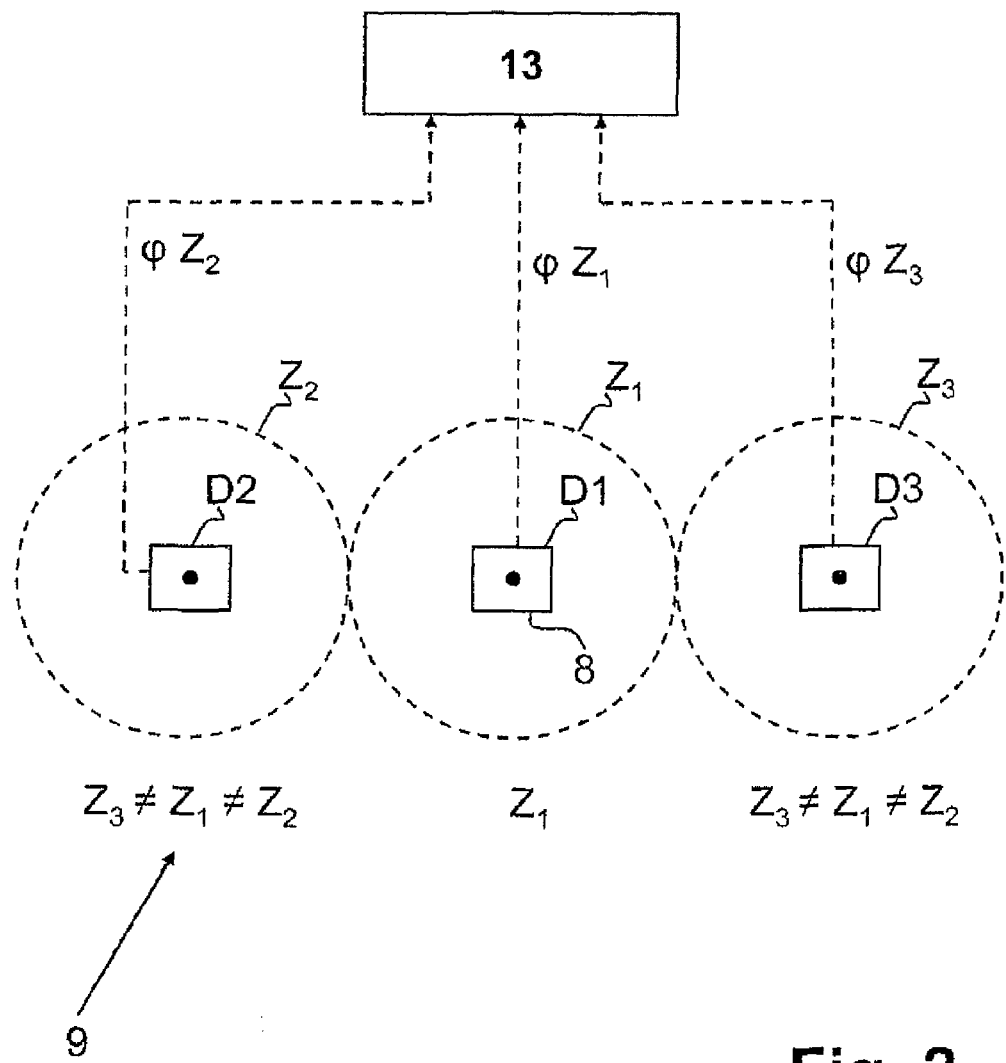
FIG. 2 is a schematic representation of an embodiment of the measuring system of the invention.

FIG. 2 shows a schematic representation of an embodiment of the measuring system of the invention, composed of three gears Z1, Z2, Z3 coupled with one another, wherein gear Z1 has a tooth count z1, gear Z2 has a tooth count z2 and gear Z3 has a tooth count z3. The tooth counts z1, z2, z3 of the gears Z1, Z2, Z3 are different from one another. Especially, the difference in tooth counts between gear Z1 and gear Z2, respectively gear Z1 and gear Z3, amounts, in each case, to one tooth. In the illustrated case, gear Z1 is associated with the shaft 8, 9 of the rotating, measured object. The gears Z2, Z3 are in direct engagement with gear Z1.

Associated with each gear Z1, Z2, Z3 is a rotation angle sensor D1, D2, D3, which registers the rotation angle $\phi_{Z1}$, $\phi_{Z2}$, $\phi_{Z3}$, of the associated gear Z1, Z2, Z3. The rotation angles $\phi_{Z1}$, $\phi_{Z2}$, $\phi_{Z3}$, of the individual gears Z1, Z2, Z3 are registered via optical, magnetic and/or electromechanical, rotation angle sensors D1, D2, D3.

Furthermore, a calculating unit 13 is provided, which ascertains at least the difference $\phi_{Z1}-\phi_{Z2}$ between the rotation angle of the second gear Z2 and that of the first gear Z1 and the difference $\phi_{Z1}-\phi_{Z3}$ between the rotation angle of the third gear Z3 and that of the first gear Z1 and, based on a sum formation SumDiff=$(\phi_{Z1}-\phi_{Z2})+(\phi_{Z1}-\phi_{Z3})$ of the differences $\phi_{Z1}-\phi_{Z2}$, $\phi_{Z1}-\phi_{Z3}$, of the ascertained rotation angles $\phi_{Z1}$, $\phi_{Z2}$, $\phi_{Z3}$ of the gears Z1, Z2, Z3, determines the number of whole numbered revolutions and the remainder rotation angle $\phi_{Z1}$ of the shaft of the measured object.

The calculating unit 13 ascertains the multi-turn resolution in the case of determining the absolute rotation angle $\phi_{Z1}$ of the shaft of the rotating, measured object using the subresolution SR determined preferably via the following equation:

$$SR = \frac{1}{\left[\left(\frac{z_1^2}{z_2 \cdot z_3}\right) - 1\right] \cdot 2}$$

$$TurnRes = n \cdot SR$$

The angle sensor D1 of gear Z1, which is associated with the shaft 8 of the measured object, registers the remainder rotation angle $\phi_{Z1}$, preferably directly. Alternatively, the calculating unit 13 determines the remainder rotation angle $\phi_{Z1}$ based on the decimal fraction portion when calculating the whole numbered revolutions, wherein preferably the following equation is used:

$$\text{Turn} = SumDiff \cdot \frac{SR}{360°} + zMS \cdot SR$$

Figure 3:
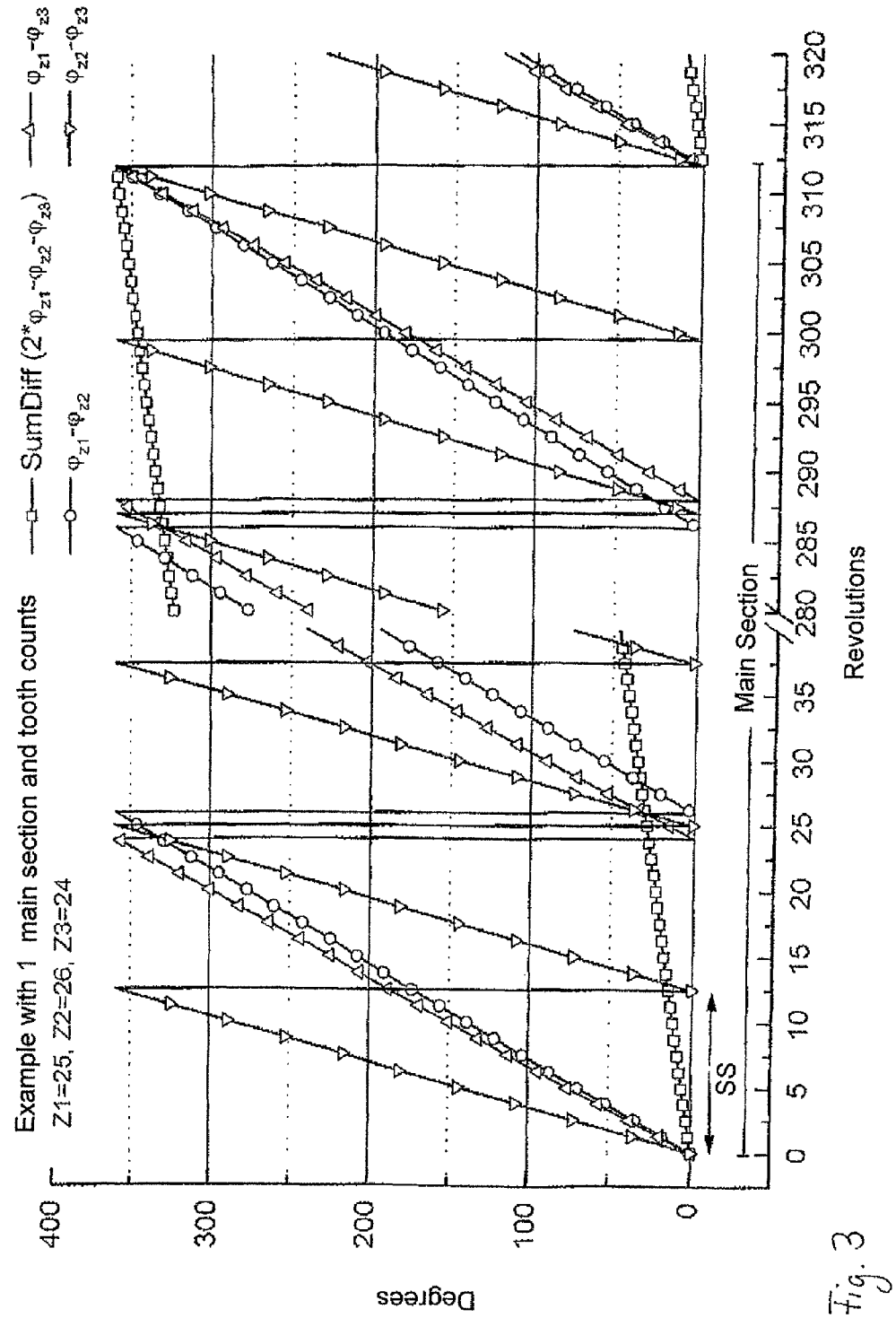
FIG. 3 is a first graph, which illustrates the multi-turn resolution, when one main section is present.

FIG. 3 shows a graph, which illustrates the multi-turn resolution TurnRes with one main section MS, thus with n=1. Plotted on the x-axis is the number of whole numbered revolutions; plotted on the y-axis are the differences of the rotation angle of the individual gears in degrees. In the illustrated case, 312 whole numbered revolutions are performed per main section. The whole numbered revolutions can be uniquely ascertained based on the sum, SumDiff, of the differences of the rotation angles $\phi_{Z1}$, $\phi_{Z2}$, $\phi_{Z3}$ of the gears Z1, Z2, Z3.

Figure 4:
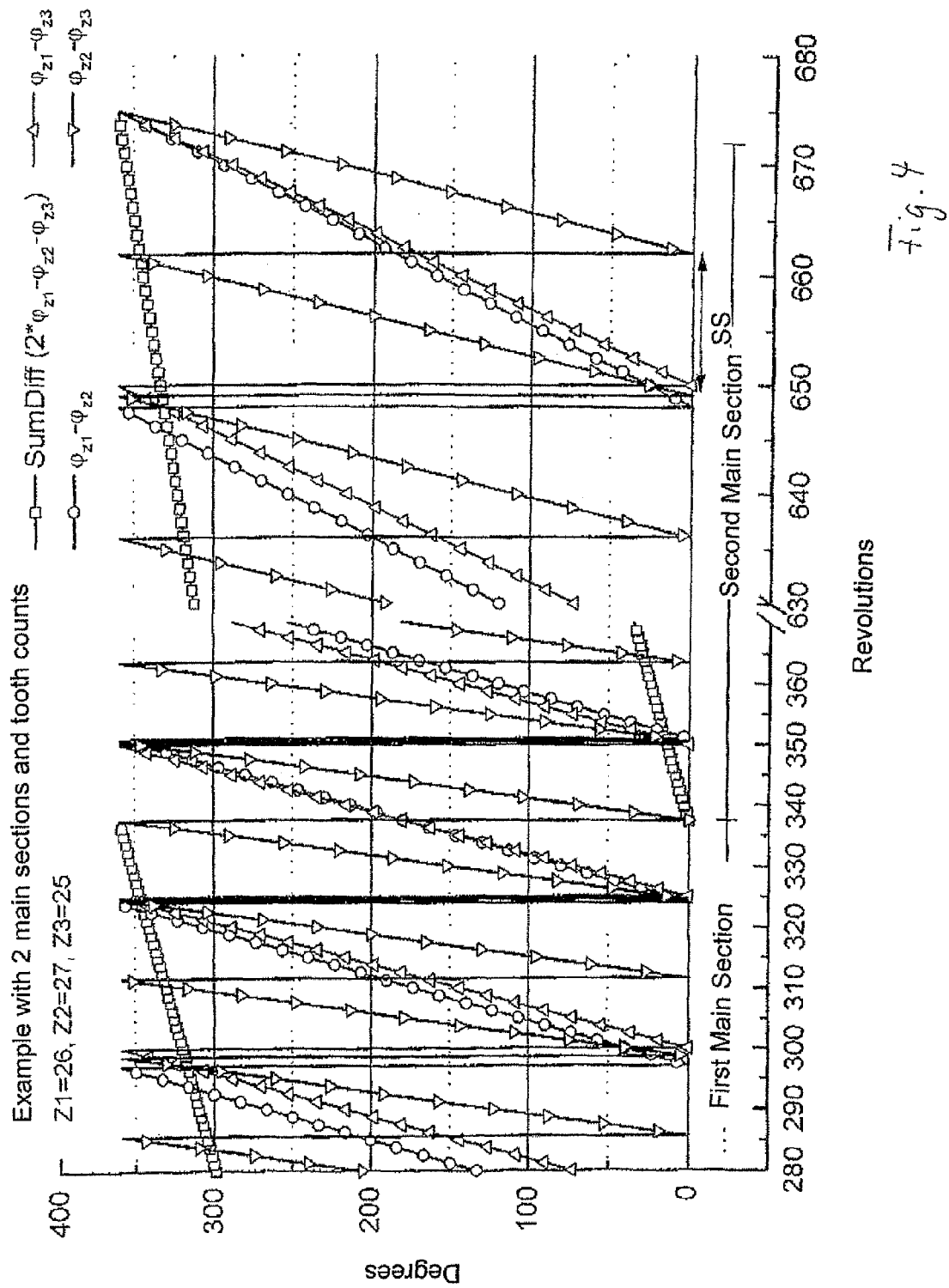
FIG. 4 is a second graph, which illustrates the multi-turn resolution in the case of two main sections.

Further presented in FIG. 3, as well as also in FIG. 4, are the angle differences $\phi_{Z1}-\phi_{Z2}$, $\phi_{Z2}-\phi_{Z3}$, $\phi_{Z1}-\phi_{Z3}$, of the ascertained rotation angles $\phi_{Z1}$, $\phi_{Z2}$, $\phi_{Z3}$ of the first gear Z1, the second gear Z2 and the third gear Z3. The corresponding curves (straight lines) have different slopes, whereby the multi-turn resolution TurnRes of the measuring system 9 is divided in subsections SS. The first subsection of the curve $\phi_{Z2}-\phi_{Z3}$ is designated in FIG. 3, by way of example. The number of subsections SS of the curve $\phi_{Z2}-\phi_{Z3}$ depends on the tooth count z1 of the first gear Z1. Since tooth count z1 of the first gear Z1 amounts to 25, there are, thus, 25 subsections SS of the curve $\phi_{Z2}-\phi_{Z3}$. The tooth counts z1, z2, z3 of the gears Z1, Z2, Z3 are so selected that the slope of the subsections $SS_i$ with i=1, ... n is greater than the slope of the main sections MS, respectively the main section MS. Based on the curves, which show the differences of the rotation angles $\phi_{Z2}-\phi_{Z3}$, respectively $\phi_{Z1}-\phi_{Z2}$, respectively $\phi_{Z1}-\phi_{Z3}$, of the first, second and third gears Z1, Z2, Z3, the resolution can be made more precise and the remainder rotation angle $\phi_{Z1}$ of the shaft 8 of the measured object determined.

FIG. 4 shows a graph, which illustrates the multi-turn resolution TurnRes with two main sections MS. In such case, the calculating unit 13, due to the difference in tooth count of the first gear Z1 relative to the second gear Z2 and of the first gear Z1 relative to the third gear Z3, wherein the difference equals dZ, wherein dZ is greater than or equal to 1, divides the total angle resolution of the measuring system 9 into n main section MS. Moreover, the calculating unit 13 ascertains the associated main section zMS based on the respective positions $\phi_{Z1}$, $\phi_{Z2}$, $\phi_{Z3}$ of the gears Z1, Z2, Z3.

The invention claimed is:

1. A measuring system for registering the absolute rotation angle of a rotating, measured object, comprising:
    a first gear associated with a shaft of the measured object, said first gear directly or indirectly engages at least a second gear and a third gear, with the tooth counts of the individual gears different from one another;
    a rotation angle sensor associated with each gear which registers the rotation angle of the associated gear; and
    a calculating unit, which ascertains at least the difference between the rotation angle of said second gear and that of said first gear and the difference between the rotation angle of said third gear and that of said first gear wherein:
    based on a summing of the differences of the ascertained rotation angles said gears, determines the number of whole numbered revolutions and the remainder rotation angle of said shaft of the measured object.

2. The measuring system as claimed in claim 1, wherein: said optical, magnetic and/or electromechanical rotation angle sensors are applied for registering the rotation angles of the individual gears.

3. The measuring system as claimed in claim 1, wherein: the tooth counts of said gears differ preferably by one tooth, so that the difference of tooth counts, in each case, equals 1.

4. The measuring system as claimed in claim 1, wherein: said calculating unit ascertains the multi-turn resolution for determining the absolute rotation angle using the subresolution in the following way:

$$SR = \frac{1}{\left[\left(\frac{z_1^2}{z_2 \cdot z_3}\right) - 1\right] \cdot 2}$$

$$TurnRes = n \cdot TA$$

with TurnRes, n∈N, SR∈Q and TurnRes≥SR, wherein TurnRes is the multi-turn resolution in the case of smallest possible n.

5. The measuring system as claimed in claim 1, wherein: the angle sensor of the gear associated with said shaft of the measured object registers the remainder rotation angle directly or said calculating unit determines said remainder rotation angle based on the decimal fraction portion in the case of calculating the whole numbered revolutions (multi-turn), wherein preferably the following equation is used:

$$Turn = SumDiff \cdot \frac{SR}{360°} + zMS \cdot SR$$

wherein zMS≤n and SumDiff is the sum of the differences of the rotation angles $\phi_{Z1}$, $\phi_{Z2}$, $\phi_{Z3}$ of the individual gears Z1, Z2, Z3, i.e.

$$SumDiff = 2 \cdot \phi_{Z1} - \phi_{Z2} - \phi_{Z3}.$$

6. The measuring system as claimed in claim 1, wherein:
said calculating unit divides by the difference forming of the ascertained rotation angles of said second gear and said third gear the angular resolution of the measuring system into subsections; and
the number of subsections depends on the tooth count of said first gear, and the slope of the subsections is greater than the slope of the main section.

7. The measuring system as claimed in claim 1, wherein:
said calculating unit divides by difference forming of the ascertained rotation angle of said first gear and that of said second gear, respectively of said first gear and that of said third gear the angular resolution of the measuring system into subsections, and
the slope of the subsections is greater than the slope of the main section.

8. The measuring apparatus as claimed in claim 1, wherein:
said calculating unit, due to the difference in tooth count of said first gear relative to said second gear and of said first gear relative to said third gear;
the difference is greater than or equal to 1, divides the total angle resolution of the measuring system into n main section; and
said calculating unit ascertains the associated main section based on the respective positions of said gears.

9. The measuring system as claimed in claim 1, wherein:
the measured object is said drive shaft and/or the output shaft of an actuator drive for actuating a flow control mechanism;
said drive shaft is connected with an actuating element;
the flow control mechanism is connected with the output shaft; and
a speed reduction transmission is provided between the actuating element and said flow control mechanism.

10. The measuring system as claimed in claim 9, wherein: said actuating element is an electric motor or an adjusting wheel.

11. The measuring system as claimed in claim 1, wherein: said gears are embodied as spur gears and/or as internally toothed gears and/or as toothed belts and/or as sprockets and/or as friction gears.

* * * * *